United States Patent
Gaines et al.

(10) Patent No.: US 11,155,969 B2
(45) Date of Patent: Oct. 26, 2021

(54) POLYSTYRENE-BASED STRUCTURAL MATERIALS

(71) Applicants: Daniel P. Gaines, Edgartown, MA (US); David Z. Webster, West Tisbury, MA (US)

(72) Inventors: Daniel P. Gaines, Edgartown, MA (US); David Z. Webster, West Tisbury, MA (US)

( * ) Notice: Subject to any disclaimer, the term of this patent is extended or adjusted under 35 U.S.C. 154(b) by 416 days.

(21) Appl. No.: 15/498,449

(22) Filed: Apr. 26, 2017

(65) Prior Publication Data
US 2018/0313041 A1 Nov. 1, 2018

(51) Int. Cl.

| | |
|---|---|
| *E01C 5/22* | (2006.01) |
| *E01C 5/20* | (2006.01) |
| *E01F 9/50* | (2016.01) |
| *B29C 70/60* | (2006.01) |
| *B29D 1/00* | (2006.01) |
| *C08J 7/04* | (2020.01) |
| *C08J 7/043* | (2020.01) |

(52) U.S. Cl.
CPC .............. *E01C 5/22* (2013.01); *B29C 70/603* (2013.01); *B29D 1/00* (2013.01); *C08J 7/043* (2020.01); *C08J 7/0427* (2020.01); *E01C 5/20* (2013.01); *E01F 9/50* (2016.02); *B05D 2201/00* (2013.01); *C08J 2325/06* (2013.01); *C08J 2463/00* (2013.01); *Y10T 428/249986* (2015.04); *Y10T 428/249991* (2015.04)

(58) Field of Classification Search
CPC ..... E01C 5/22; E01C 5/20; C08J 7/047; C08J 2463/00; C08J 2325/06
See application file for complete search history.

(56) References Cited

U.S. PATENT DOCUMENTS

| | | | | |
|---|---|---|---|---|
| 4,734,302 | A | * 3/1988 | Baskin | B05D 5/061 |
| | | | | 427/198 |
| 5,104,715 | A | * 4/1992 | Cruz | E04C 2/205 |
| | | | | 156/250 |
| 2004/0037992 | A1* | 2/2004 | Hrovath | E04F 13/0862 |
| | | | | 428/44 |
| 2006/0265974 | A1* | 11/2006 | Tan | A63F 9/10 |
| | | | | 52/173.1 |

(Continued)

FOREIGN PATENT DOCUMENTS

| | | | | |
|---|---|---|---|---|
| CN | 103121813 A | * | 5/2013 | |
| DE | 3244585 A1 | * | 5/1984 | ......... E04D 13/1631 |

OTHER PUBLICATIONS

Abstractor DE 3244585, Friemuth Bernd, Nov. 15, 1982. (Year: 1982).*

(Continued)

*Primary Examiner* — Hai Vo
(74) *Attorney, Agent, or Firm* — Fish & Richardson P.C.

(57) ABSTRACT

The disclosure features structural tiles and methods for forming such tiles, the tiles including a tile body featuring one or more polystyrene materials, and a coating featuring an epoxy resin and an aggregate material, disposed on at least one surface of the tile body, where the structural tile has a dry coefficient of kinetic friction of at least 0.75 and a wet coefficient of kinetic friction of at least 0.70, and where the dry coefficient of kinetic friction is larger than the wet coefficient of kinetic friction by 0.05 or less.

17 Claims, 8 Drawing Sheets

(56) References Cited

U.S. PATENT DOCUMENTS

| | | | | |
|---|---|---|---|---|
| 2007/0039262 A1* | 2/2007 | Forgy | ...................... | E04C 2/296 |
| | | | | 52/309.16 |
| 2007/0186493 A1* | 8/2007 | Baig | .................... | E04B 9/0464 |
| | | | | 52/144 |
| 2007/0261353 A1* | 11/2007 | Cullen | .................... | E04F 13/04 |
| | | | | 52/590.2 |
| 2010/0173128 A1* | 7/2010 | Rotenberg | ............. | B05D 3/107 |
| | | | | 428/142 |
| 2010/0300023 A1* | 12/2010 | Rosan | ................... | E04F 15/105 |
| | | | | 52/302.1 |
| 2011/0217516 A1* | 9/2011 | Wedi | ........................ | B32B 5/18 |
| | | | | 428/150 |
| 2014/0272302 A1* | 9/2014 | Ciuperca | ................... | B44C 5/04 |
| | | | | 428/150 |
| 2017/0066690 A1* | 3/2017 | Schoneveld | ............ | C04B 26/02 |

OTHER PUBLICATIONS

Translation of CN 103121813, Xiong Jianzhen, May 29, 2013. (Year: 2013).*

* cited by examiner

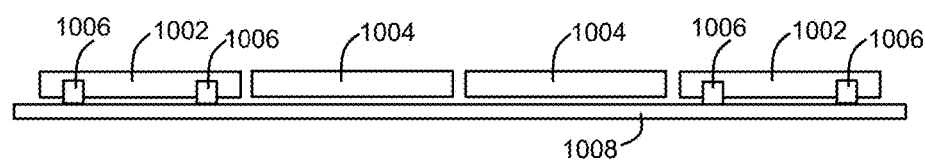
FIG. 10
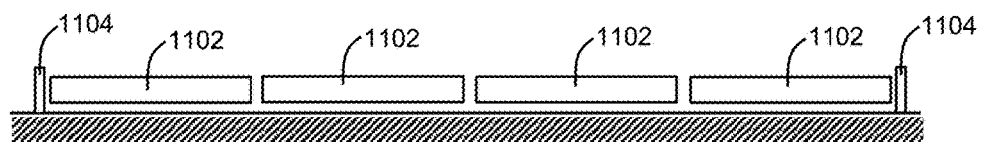
FIG. 11
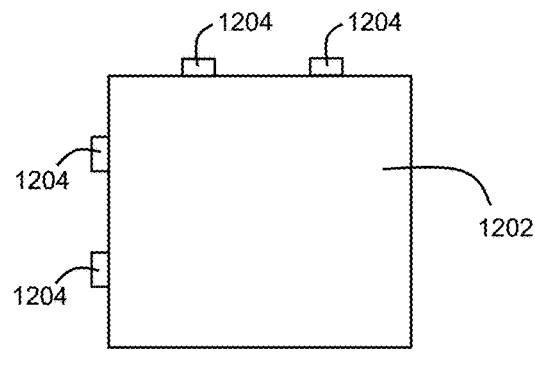 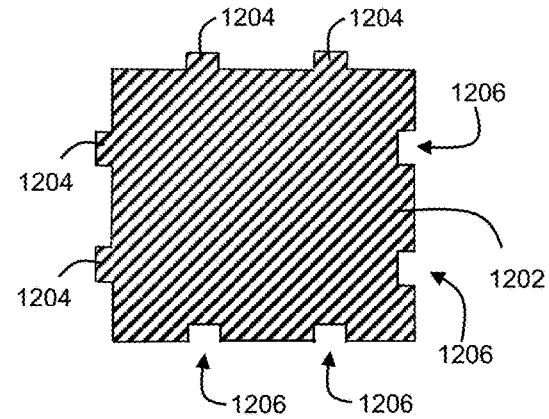
FIG. 12A          FIG. 12B

POLYSTYRENE-BASED STRUCTURAL MATERIALS

TECHNICAL FIELD

This disclosure relates to materials used for roads, sidewalks, bridges, and other vehicle and pedestrian transportation thoroughfares.

BACKGROUND

Roads, sidewalks, and bridges are typically constructed from structural materials such as concrete and asphalt. Concrete production is energy- and resource-intensive, and is estimated to be responsible for between 5% and 10% of global human carbon dioxide emissions. Asphalt is typically composed of asphalt cement, sand, aggregate material, and petroleum compounds, and sustained production is dependent upon continued recovery of crude oil from various sources.

The United States spends roughly $120 billion per year on road construction, and a significant majority of this total expenditure is directed toward repair of existing roads, bridges, and sidewalks. It is estimated that the United States would have to sustain annual expenditures of approximately $90 billion just to maintain current roads in their present condition. Deterioration of existing road, bridge, and sidewalk infrastructure therefore represents an ongoing problem. It is estimated that approximately one third of all highway accidents are attributable, at least in part, to poor road conditions. If existing infrastructure continues to deteriorate, this number will likely grow.

SUMMARY

This disclosure features structural materials for construction of roadways, sidewalks, bridges, and other thoroughfares designed to support vehicular and pedestrian traffic. The materials are derived from recycled polystyrene, and typically take the form of tiles that can be used during original construction, or during repair/replacement of existing structures previously constructed from concrete, asphalt, and other structural materials. The disclosure also features methods of producing the structural materials, including methods for adjusting the compositions of the materials and the physical characteristics of the tiles.

In general, in a first aspect, the disclosure features structural tiles that include a tile body featuring one or more polystyrene materials, and a coating featuring an epoxy resin and an aggregate material, disposed on at least one surface of the tile body, where the structural tile has a dry coefficient of kinetic friction of at least 0.75 and a wet coefficient of kinetic friction of at least 0.70, and where the dry coefficient of kinetic friction is larger than the wet coefficient of kinetic friction by 0.05 or less.

Embodiments of the tiles can include any one or more of the following features.

The dry coefficient of kinetic friction can be larger than the wet coefficient of kinetic friction by 0.03 or less. The aggregate material can include sand. The coating can be disposed on all surfaces of the tile body.

The tile body can include at least two different polystyrene materials. The tile body can include at least one fluorescent agent. At least one of the one or more polystyrene materials can include a functional group featuring a fluorescent chemical moiety. The tile body can include particles or wires formed from at least one metallic material. The tile body can include one or more coloring agents.

The tiles can include a plurality of pores formed in the tile body. At least some of the plurality of pores can extend completely through a thickness of the tile body from a first surface of the tile body to a second surface of the tile body opposite the first surface, forming channels in the tile body. A density of pores in the tile body can be 30% or less (e.g., 5% or less) of a total volume of the tile body.

The tile body can include sand.

Embodiments of the tiles can also include any of the other features disclosed herein, including combinations of features disclosed in connection with different embodiments, except as expressly stated otherwise.

In another aspect, the disclosure features methods for producing structural tiles, the methods including dissolving one or more polystyrene materials in acetone to generate a polystyrene solution, placing the polystyrene solution into a mold, positioning a mold cap featuring a plurality of extensions relative to the polystyrene solution so that the plurality of extensions extend at least partially into the polystyrene solution, evaporating the acetone from the solution to form a solid tile featuring a plurality of pores in a body of the tile, and applying a coating including an epoxy resin and an aggregate material to at least one surface of the tile body.

Embodiments of the methods can include any one or more of the following features.

The aggregate material can include sand. The methods can include adding at least one fluorescent agent to the tile body. Adding the at least one fluorescent agent comprises derivatizing at least one of the one or more polystyrene materials in the polystyrene solution to include at least one fluorescent chemical moiety.

The methods can include adding sand to the polystyrene solution.

The methods can include positioning the mold cap so that at least some of the pores extend completely through a thickness of the tile body from a first surface of the tile body to a second surface of the tile body opposite the first surface.

Embodiments of the methods can also include any of the other features disclosed herein, including combinations of features disclosed in connection with different embodiments, except as expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 10 is a schematic diagram of an assembly of tiles.

FIG. 11 is a schematic diagram of another assembly of tiles.

FIG. 12A is a schematic diagram of a tile with extensions and cooperating recesses.

FIG. 12B is a cross-sectional diagram of the tile of FIG. 12A.

Like reference symbols in the various drawings indicate like elements.

DETAILED DESCRIPTION

Figure 1:
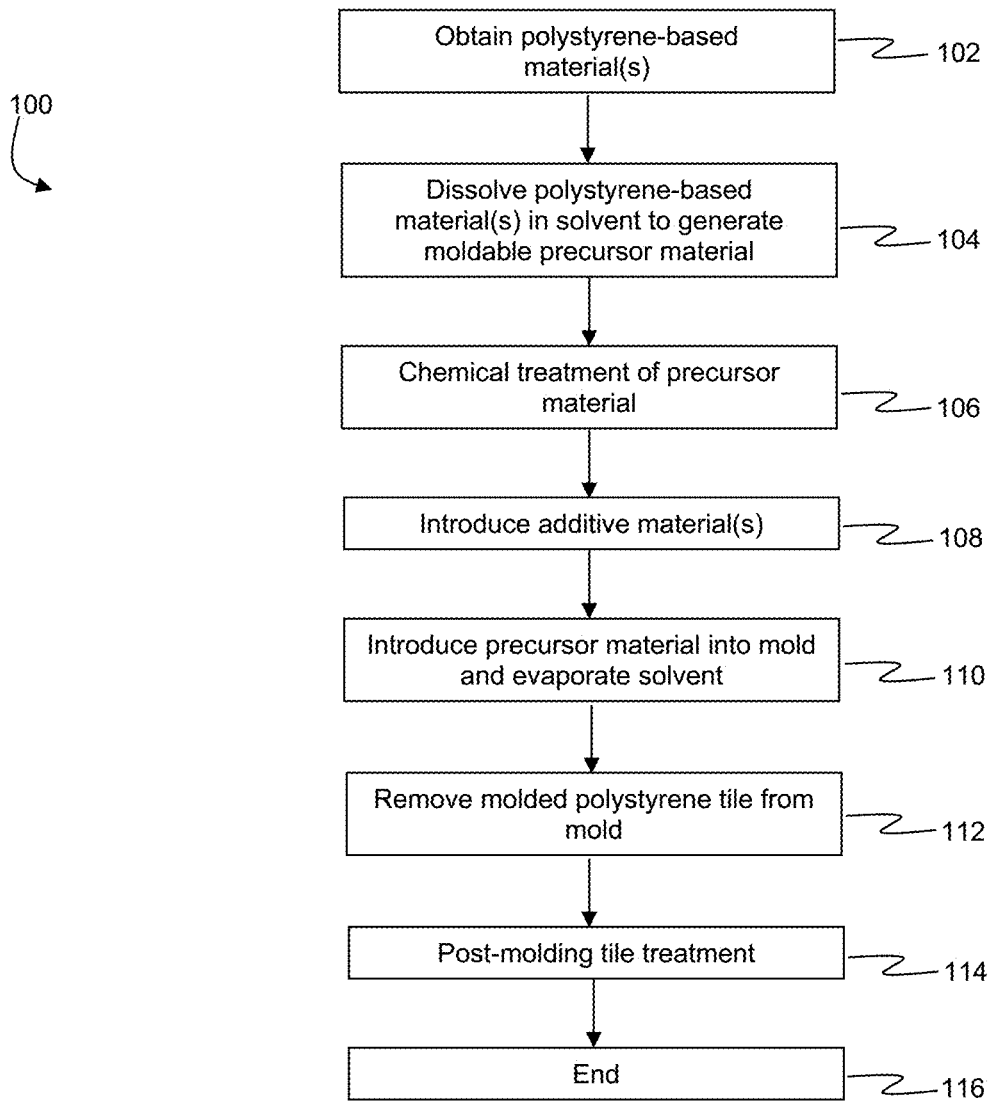
FIG. 1 is a flow chart showing a series of example steps for fabricating structural tiles.

Production of both concrete and asphalt for use in construction of roads, sidewalks, bridges, and more generally, thoroughfares that support vehicular and/or pedestrian traffic is both resource- and energy-intensive. Many industrial production processes currently in use also generate significant quantities of harmful waste products, such as carbon dioxide (from concrete production) and waste petroleum products (from asphalt production).

The concrete industry also has a less-than-perfect safety record, and approximately ten percent of workers employed in concrete manufacturing/construction receive serious work-related injuries, including chemical burns, lung damage, eye trauma, and other physical ailments. Exposure to concrete dust, in particular, is increasingly being recognized as a major contributing factor to subsequent lung and respiratory ailments. In natural disaster-prone areas, this risk is elevated further and affects not just concrete industry workers but the general public as well, as such disasters—and the attendant destruction of concrete-containing structures—can introduce large quantities of concrete dust into the environment.

Consequently, partially or fully replacing concrete and asphalt with a new structural material might eliminate costly production processes, reduce energy consumption, improve working conditions for individuals in the structural materials industry, improve the durability and lifetime of roadways, bridges, sidewalks and other thoroughfares, and reduce maintenance costs. However, suitable replacement materials which can be produced at low cost and high volume, and which have favorable chemical and mechanical properties for use in thoroughfares, have been challenging to find.

Polystyrene and its functionalized derivatives are produced in large quantities worldwide every year. Commonly referred to collectively as "Styrofoam", approximately 1.85 billion pounds of these materials are produced annually. Polystyrenes typically have a high percentage of air per unit volume (e.g., up to about 95% air per unit volume), and are therefore widely used as packaging materials due to their mechanical compliance and relatively low mass.

Unfortunately, relatively few options exist for environmentally friendly disposal of waste polystyrenes. Many recycling facilities do not accept polystyrene-based waste products; such products are then typically discarded in landfills, or improperly disposed of as litter. Facilities that process polystyrenes typically use heat to melt the waste materials which is an energy-intensive processing method. Because of its relatively low mass and high pore (i.e., air) content, polystyrene-based waste is also difficult to transport economically, and occupies significant volumes in landfills. Because of these relatively limited post-use processing options, some localities have banned single-use polystyrene products.

The inventors have discovered, however, that waste polystyrene materials can be processed to form tiles and other forms that can be used as structural materials in the construction and/or repair of roads, sidewalks, bridges, and other thoroughfares. The structural forms exhibit high mechanical strength, resistance to wear, and a suitably high coefficient of friction to allow the forms to function effectively as replacements for concrete- and asphalt-based materials.

The processing methods disclosed herein use one or more organic solvents to solubilize waste polystyrene materials. One such solvent suitable for use is acetone, which is widely and economically available commercially. In general, polystyrenes are highly soluble in acetone. As the concentration of dissolved polystyrene in acetone increases, the polystyrene acquires a clay-like consistency, allowing it to be molded into a variety of structural forms. After molding, the acetone (and/or other organic solvent(s)) can be evaporated, leaving behind a molded polystyrene tile having a shape that conforms to the shape of the mold. Because of its relatively high vapor pressure, acetone evaporation proceeds relatively rapidly at standard temperature and pressure, or with gentle heating. The process of dissolving and molding the polystyrene effectively reduces the amount of air trapped within the solid polystyrene structure, yielding tiles of increased density relative to the initial polystyrene material.

It should be noted that in the following discussion, the term "tile" will be used to refer to the molded form of the polystyrene-based products generated using the methods disclosed herein. The term "tile" is used in a general manner, and includes structures of two- and three-dimensional shapes, structures of regular and irregular shapes, and structures having a variety of compositions. While tiles that are used for certain applications in the construction of roads, bridges, sidewalks, and other thoroughfares may have lateral dimensions (i.e., dimensions in the plane of the thoroughfare) that are larger than the thickness dimension (i.e., in a direction orthogonal to the plane of the thoroughfare), it should be appreciated that tiles having a wide variety of different shapes can be produced using the methods disclosed herein, and the term "tile" is intended to encompass all such shapes.

It should also be noted that roads, sidewalks, and bridges are specific examples of "thoroughfares", which term is intended to encompass all surfaces, structures, and portions of buildings that support vehicular and pedestrian traffic. In general, unless expressly stated otherwise herein, the polystyrene-based tiles fabricated according to the methods of the present disclosure can be used for construction and repair of all such thoroughfares, and can also generally be used as structural materials in other construction applications as well.

FIG. 1 is a schematic diagram showing a flow chart 100 that includes a series of steps for fabricating polystyrene-based tiles. In a first step 102, one or more polystyrene-based materials are obtained. Typically, the materials are obtained as waste streams from trash collection and separation, as waste material from packaging facilities, and/or as byproducts from industrial manufacturing processes. In general, however, suitable polystyrene-based materials can be obtained from a wide variety of sources.

Figure 2:
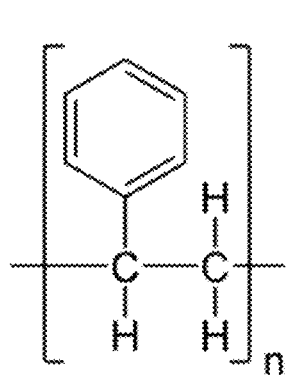
FIG. 2 is a schematic diagram showing the chemical structure of polystyrene.

FIG. 2 is a schematic diagram showing the chemical structure of polystyrene. As explained above, polystyrene derived any of a wide variety of sources can be used in the steps of flow chart 100. However, functionalized polystyrenes having a wide variety of chemical structures can also be used in addition to, or as alternatives to, non-functionalized polystyrene.

Figure 3:
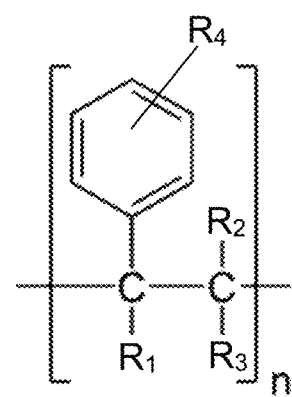
FIG. 3 is a schematic diagram showing chemical structures of functionalized polystyrenes.

FIG. 3 is a schematic diagram showing the chemical structure of functionalized polystyrenes. As shown in FIG. 3, polystyrenes that can be used in the methods disclosed herein include polystyrenes that include functional groups at any one or more of the $R_1$, $R_2$, and $R_3$ positions. In addition, polystyrenes that can be used can include one or more functional groups $R_4$ at any of between one and five different positions on the aromatic ring. If multiple functional groups $R_4$ are present on the aromatic ring, the functional groups can be the same or different.

In general, $R_1$-$R_4$ can each correspond to any one of a wide variety of functional groups, including halogens (i.e., F, Cl, Br, I), amine groups and derivatized amine groups, nitro groups, saturated hydrocarbon groups, unsaturated hydrocarbon groups, aromatic groups that include one or more rings, cyclic hydrocarbon groups, ester groups and derivatized ester groups, ether groups and derivatized ether groups, hydroxyl groups, thiol groups, azide groups, carboxyl groups, and other chemical functional groups. The polystyrene-based materials can also include mixtures of any two or more of the foregoing materials.

Returning to FIG. 1, in the next step 104, the polystyrene-based materials are dissolved in a solvent to generate a moldable pre-cursor material. In some embodiments, the solvent used is acetone, as polystyrene-based materials have high solubility in acetone. Other organic solvents can also be used in combination with, or as alternatives to, acetone.

In certain embodiments, dissolution of the polystyrene-based materials is aided by mechanical stirring of the solution. Typically, dissolution continues with stirring until the solution is homogeneous in appearance, and has a consistency resembling moldable clay.

Next, in optional step 106, the dissolved polystyrene-based materials can be chemically functionalized to introduce one or more chemical functional groups into the polystyrene structure. For example, any of $R_1$-$R_4$—if not already present in the dissolved polystyrene-based materials—can be introduced using standard chemical functionalization methods.

For example, in some embodiments, cross-linkable functional groups (such as unsaturated hydrocarbon groups) can be introduced at any of $R_1$-$R_4$. The cross-linkable functional groups can then be cross-linked during a subsequent processing step (e.g., by exposure to heat and/or light in step 114), increasing the mechanical strength of the fabricated tiles.

As another example, in certain embodiments, one or more fluorescent and/or luminescent functional groups can be introduced at any of $R_1$-$R_4$. When the fabricated tiles are used in the construction of roads, sidewalks, bridges, and other thoroughfares, the fluorescent and/or luminescent functional groups emit light, which can be used to enhance visibility of these structures for vehicular and pedestrian navigation at night and during other periods of low visibility, such as during storms.

In general, a wide variety of different fluorescent and/or luminescent functional groups can be introduced. Examples of such groups include, but are not limited to, groups that include: xanthene-based moieties such as fluorescein, rhodamine, Oregon green, eosin, and Texas red; cyanine-based moieties such as cyanine, indocarbocyanine, oxacarbocyanine, thiacarbocyanine, and merocyanine; squaraine-based moieties; naphthalene-based moieties; coumarin-based moieties; oxadiazole-based moieties such as pyridyloxazole, nitrobenzoxadiazole, and benzoxadiazole; anthracene-based moieties such as anthraquinones; pyrene-based moieties; oxazine-based moieties such as Nile red, Nile blue, and cresyl violet; acridine-based moieties such as proflavin, acridine orange, and acridine yellow; arylmethine-based moieties such as auramine, crystal violet, and malachite green; and tetrapyrrole-based moieties such as porphin, phthalocyanine, and bilirubin.

Then, in optional step 108, one or more additive materials can be introduced into the dissolved polystyrene-based materials. In general, additive agents can be used to enhance the mechanical and/or chemical properties of the fabricated tiles. A wide variety of different agents can be added.

In some embodiments, for example, one or more abrasive materials can be added to the dissolved polystyrene-based materials to enhance the coefficient of friction of the fabricated tiles. Tiles with surfaces having a coefficient of friction that is too low may be unsuitable for use in roads and sidewalks, as the danger of vehicles and/or pedestrians slipping on structures formed from such tiles may be too great. Abrasive materials such as sand and small-size aggregate materials (e.g., stone) added to the dissolved polystyrene-based materials will increase the static and dynamic coefficients of friction of the materials, thereby improving the "grip" of both tires and footwear.

As another example, in certain embodiments, one or more fluorescent and/or luminescent materials can be added to the dissolved polystyrene-based materials. Examples of suitable fluorescent and/or luminescent materials include materials that include any of the fluorescent and/or luminescent chemical moieties discussed above in connection with step 106.

In some embodiments, one or more coloring agents can be added to the dissolved polystyrene-based materials. Coloring agents can be used to enhance the visibility of the fabricated tiles. For construction of roads and sidewalks where colored markings (e.g., lane dividers, arrows, warning indicators, and other embedded markings) are used, coloring agents can be incorporated directly into the tiles. Colored tiles can then be laid in appropriate locations and/or grouped in patterns to locate appropriate markings on the road or sidewalk. By embedding the coloring agents directly in the tiles, the task of repainting markings on roads and sidewalks can be performed less frequently, or even eliminated. Suitable coloring agents include various dyes, paints, and pigments, in any color as desired.

In certain embodiments, one or more metals can be added to the dissolved polystyrene-based materials. Metals can be added, e.g., in the form of particles, wires, meshes, etc. to impart electrical conductivity to the fabricated tiles. By introducing one or more metals (and optionally attaching one or more electrodes), electrical signals can be delivered to the tiles, and the tiles can be connected to one another electrically during installation to form a grid of tiles in electrical communication. The electrically connected tiles can transmit and receive electrical signals among one another, and can also receive electrical signals from an external source. For example, the tiles can be resistively heated by an external source that directs an electrical current to flow through the files. Suitable metals for inclusion can be, for example, copper, aluminum, stainless steel, silver, iron, zinc, and mixtures of two or more such metals.

In some embodiments, one or more UV-protective agents can be added to the dissolved polystyrene-based materials. The UV-protective agents generally reduce the rate at the polystyrene-based materials undergo photo-degradation (i.e., photo-oxidation) when the materials are molded to form tiles. A variety of different materials can be added to the polystyrene-based materials and integrally mixed with the materials prior to molding to ensure that UV protection is provided throughout the structure of the molded tiles. Suitable UV-protective materials include, but are not limited to, epoxy resins, pigments such as Al, $Fe_2O_3$, $Fe_3O_4$, ZnO, $TiO_2$, organic UV absorbing materials such as azoquenones and anthoquenones, quenchers such as metal chelates (i.e., chelates of metals such as Ni, Sn, Zn, and Cu), carbon black, salicylates and derivatives thereof, salicylanides and derivatives thereof, azoles such as hydroxyphenyl benzothiazoles, benzophenones such as hydroxybenzophenone and derivatives thereof, phenolic compounds, peroxide decomposers/scavengers such as organic phosphites, Ni chelates, and hindered (i.e., cyclic) amine compounds, anti-oxidants such as hindered phenol compounds, aromatic amines, and quinones, photostabilizers such as metal complexes (i.e., Sn, Cd, Ni, Zn, and Cu for example) of 2-thioacitic acid benzothiazol, benzothiazoles and derivatives thereof, 2-hydroxy-4-methoxybenzophenone, hydroxyl phenyl pyrazole, thiadiazole compounds, hydroxyphenyltriazine and derivatives thereof, dihydroxyphenylpyrazoles and derivatives thereof, uracil and derivatives thereof, anthraquinone and derivatives thereof alone or complexed with metals such as Cu, Ni, and oxovanadium, and 2,3-dihydro-(5-mercapto-1,3,4-oxadiazol-2-yl)-phenyl-2-(substituted)-oxazepine-4,7-dione and derivatives thereof.

In certain embodiments, one or more thermal stabilizers can be added to the dissolved polystyrene-based materials. Thermal stabilizers function to retard or prevent depolymerization and other degradative reactions in polystyrenes. Such reactions can lead to discoloration, increased brittleness, and general reduction in favorable mechanical properties. A variety of different thermal stabilizers can be added to the polystyrene-based materials and integrally mixed therein prior to molding to ensure that thermal protection is provided throughout the structure of the molded tiled. Suitable thermal stabilizers include, but are not limited to, various organosulfur compounds such as mercaptides, benzofuranone, a variety of hindered phenols, secondary aromatic amines, various hindered (i.e., cyclic) amines, lead-based compounds (both organic and inorganic) such as dibasic lead stearates and phthalates, tribasic lead sulfates, dibasic lead phosphites, and dibasic lead carbonates, mixed metals based on Ba/Cd, Ba/Zn, and Ca/Zn as salts of fatty acids such as stearates and laurates, organophosphites, β-diketones, and organotin compounds such as dibutyl mercaptides, octyltin mercaptides, dibutyltin maleates, and derivatives of these (e.g., methylated tin derivatives).

Next, in step 110, the dissolved polystyrene-based materials are introduced into a mold, and the solvent is evaporated to form a polystyrene-based tile. In some embodiments, solvent evaporation can occur un-aided, as the vapor pressure of solvents such as acetone is relatively high. In certain embodiments, solvent evaporation can be aided by gentle heating to accelerate the rate at which the solvent vaporizes.

In certain embodiments, solvent evaporation can also be accompanied by agitation during at least a portion of the evaporation period. Agitation of the dissolved polystyrene-based materials can be used to ensure that trapped air (in the form of bubbles) in the materials is released, condensing the materials into a denser solid form once solvent evaporation is complete.

Figure 4:
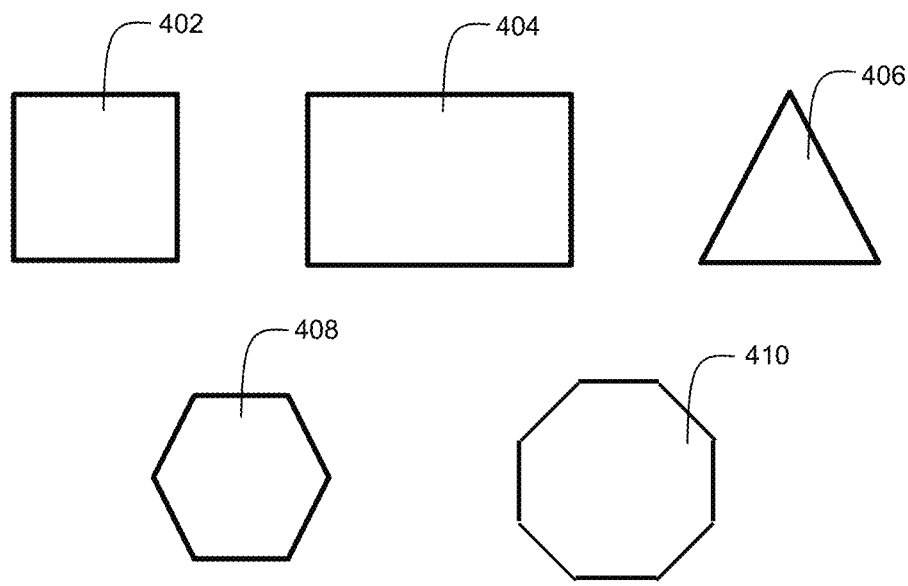
FIG. 4 is a schematic diagram showing tiles of different shapes.

In general, tiles of the polystyrene-based material that are formed during the molding process can have any of a number of different shapes. In some embodiments, the tiles have a square or rectangular shape as they are formed in a square or rectangular mold. Many other shapes are also possible, and useful for arraying tiles to form a road, sidewalk, bridge, and/or other thoroughfare. Examples of such shapes include triangular tiles, hexagonal tiles, and octagonal tiles. More generally, the tiles can be formed in any one or more regular or irregular geometric shapes as desired. FIG. 4 is a schematic diagram showing examples of square tiles 402, rectangular tiles 404, triangular tiles 406, hexagonal tiles 408, and octagonal tiles 410.

During the molding process in step 110, pores or channels can be introduced into the tiles. Such pores or channels can perform a variety of functions. For example, pores or channels can represent voids in the structure of the tiles, which reduces the weight of the tiles (as these voids are not occupied by condensed polystyrene-based materials). Channels that extend through the tiles can allow water and other fluid substances to flow through the tiles, which can be beneficial for removing water from the surface of a road formed from the tiles. As a result of such channels, drainage from a road formed from the tiles can be improved relative to a road formed from conventional materials such as concrete and asphalt.

Further, pores and/or channels formed in tiles can allow other materials to be incorporated into the bulk structure of the tiles. The introduction of such materials is discussed in greater detail below.

Figure 5A:
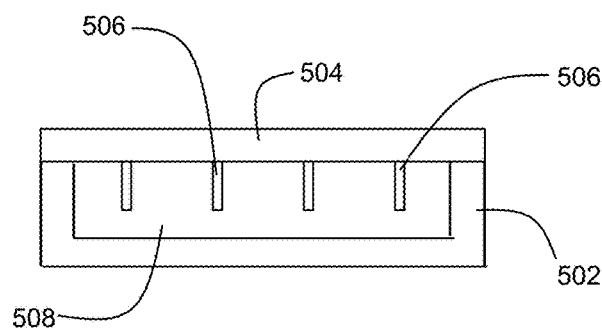
FIG. 5A is a schematic cross-sectional diagram showing a mold and mold cap.
Figure 5B:
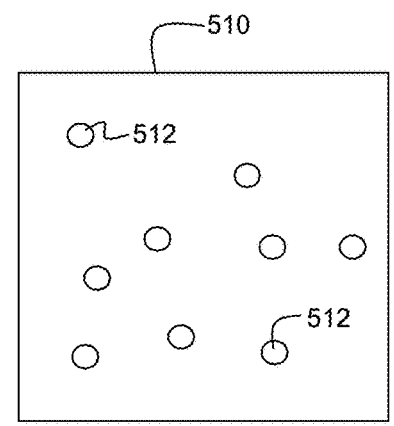
FIG. 5B is a schematic diagram showing a tile with pores and/or channels.

Various methods can be used to introduce pores and/or channels into the tiles during the molding process. In some embodiments, for example, a mold cap that includes protruding extensions can be pressed into the polystyrene-based materials to form pores and/or channels. FIG. 5A is a schematic cross-sectional diagram showing a polystyrene-based material 508 in a mold frame 502. A mold cover 504 that includes a plurality of extensions 506 fits over mold frame 502 such that extensions 506 penetrate into polystyrene-based material 508. FIG. 5B shows an example of a tile 510 that is fabricated using the mold frame 502 and cover 504 in FIG. 5A. Tile 510 includes a plurality of pores or channels 512 that extend partially or completely through the thickness of the tile.

Returning to FIG. 1, in step 112, the solid, molded polystyrene-based tile is then removed from the mold. Next, in step 114, a post-molding treatment can optionally be performed. In general, the post-molding treatment includes applying one or more materials to the surface of the tile to adjust the tile's chemical and/or physical properties.

For example, in some embodiments, one or more mechanical strengthening agents can be applied to one or more surfaces of the tiles. In addition to increasing the mechanical strength (i.e., the tensile, compressive, and/or shear modulus) of the tiles, such strengthening agents can also act as a type of "mortar" or bonding agent, allowing multiple tiles to be joined together to form a road, sidewalk, bridge, or other thoroughfare. Suitable agents include various epoxy resins, for example.

In certain embodiments, one or more UV-protective coatings can be applied to one or more surfaces of the tiles. UV-protective coatings reduce the rate at which the tiles undergo photo-oxidation and, more generally, photo-degradation when exposed to natural sunlight and artificial light from vehicles and overhead roadway lighting. Mechanical strengthening agents such as epoxy resins can function as UV-protective coatings. Alternatively, or in addition, one or more additional UV-protective materials can be added to tile surfaces in step 114 via various coating processes. The UV-protective materials can be different from, or the same as, any UV-protective materials that were added to the dissolved polystyrene-based materials prior to molding. Suitable UV-protective materials include, but are not limited to, epoxy resins, pigments such as Al, $Fe_2O_3$, $Fe_3O_4$, ZnO, $TiO_2$, organic UV absorbing materials such as azoquenones and anthoquenones, quenchers such as metal chelates (i.e., chelates of metals such as Ni, Sn, Zn, and Cu), carbon black, salicylates and derivatives thereof, salicylanides and derivatives thereof, azoles such as hydroxyphenyl benzothiazoles, benzophenones such as hydroxybenzophenone and derivatives thereof, phenolic compounds, peroxide decomposers/scavengers such as organic phosphites, Ni chelates, and hindered (i.e., cyclic) amine compounds, anti-oxidants such as hindered phenol compounds, aromatic amines, and quinones, photostabilizers such as metal complexes (i.e., Sn, Cd, Ni, Zn, and Cu for example) of 2-thioacitic acid benzothiazol, benzothiazoles and derivatives thereof, 2-hydroxy-4-methoxybenzophenone, hydroxyl phenyl pyrazole, thiadiazole compounds, hydroxyphenyltriazine and derivatives thereof, dihydroxyphenylpyrazoles and derivatives thereof, uracil and derivatives thereof, anthraquinone and derivatives thereof alone or complexed with metals such as Cu, Ni, and oxovanadium, and 2,3-dihydro-(5-mercapto-1,3,4-oxadiazol-2-yl)-phenyl-2-(substituted)-oxazepine-4,7-dione and derivatives thereof.

In certain embodiments, one or more thermal stabilizers can be applied as protective coating materials to one or more surfaces of the tiles. Thermal stabilizers applied to tile surfaces can be the same as, or different from, thermal stabilizers added to the dissolved polystyrene-based materials discussed previously. Suitable thermal stabilizers include, but are not limited to, various organosulfur compounds such as mercaptides, benzofuranone, a variety of hindered phenols, secondary aromatic amines, various hindered (i.e., cyclic) amines, lead-based compounds (both organic and inorganic) such as dibasic lead stearates and phthalates, tribasic lead sulfates, dibasic lead phosphites, and dibasic lead carbonates, mixed metals based on Ba/Cd, Ba/Zn, and Ca/Zn as salts of fatty acids such as stearates and laurates, organophosphites, β-diketones, and organotin compounds such as dibutyl mercaptides, octyltin mercaptides, dibutyltin maleates, and derivatives of these (e.g., methylated tin derivatives).

In some embodiments, one or more materials that increase the coefficient of friction of the tiles can be applied to the surface(s) of the tiles in step 114. Suitable materials are discussed above, and include various sand materials and small-size aggregrate materials.

In certain embodiments, one or more chemical protective agents that protect the tiles from chemical degradation can be applied to the surface(s) of the tiles in step 114. Chemical protective agents can be used to impede degradation of the polystyrene-based materials due to exposure (e.g., when the tiles are used to construct roads, sidewalks, bridges, and other thoroughfares) to acids, petroleum-based compounds such as oil and gasoline, and other agents. A variety of chemical protective agents can be applied, including but not limited to, fluorinated hydrocarbon-based compounds. Such agents can be applied using processes such as spray coating, "painting", dipping the tiles in the agents, and vapor deposition. Mechanical strengthening agents such as epoxy resins can also be used as chemical protective agents in some embodiments.

In some embodiments, one or more fluorescent and/or luminescent agents can be applied to the tile surface(s) in step 114. Suitable fluorescent and/or luminescent agents can include, for example, compounds featuring any of the fluorescent and/or luminescent chemical moieties discussed above.

After optional step 114 is complete, the fabrication process ends at step 116.

Tiles fabricated according to the process shown in FIG. 1 can generally be formed from any of the polystyrene-based materials discussed above, including mixtures of any two or more of the materials. In general, the molding process reduces the amount of gas (i.e., air) in the polystyrene-based materials, relative to their original structure prior to step 102, increasing the density of the materials. For example, in some embodiments, amount of gas in the tiles, as a volume percentage of the total volume of the tiles, is 30% or less (e.g., 25% or less, 20% or less, 15% or less, 10% or less, 5% or less, 3% or less, 1% or less). This volume percentage can also be regarded as the density of pores or channels in the tiles as a percentage of the volume of the tiles.

The density of pores in the polystyrene-based materials is significantly reduced relative to the density of pores in the materials prior to dissolution and molding. According to the process shown in FIG. 1, the density of pores in the polystyrene-based tiles is reduced by a factor of at least 1.5 (e.g., at least 1.7, at least 1.8, at least 2.0, at least 2.2, at least 2.5, at least 3.0, at least 3.5) relative to the density of pores in the polystyrene-based materials prior to dissolution. The density of pores corresponds to the volume percentage of voids (or gas) in the bulk structure of the materials.

Tiles fabricated according to the process shown in FIG. 1 can have a coefficient of static friction when dry of at least 0.85 (e.g., at least 0.87, at least 0.90, at least 0.95, at least 0.97, at least 0.98, at least 0.99). The tiles can have a coefficient of kinetic friction when dry of at least 0.65 (e.g., at least 0.70, at least 0.75, at least 0.80, at least 0.85).

When wet, tiles fabricated according to the process shown in FIG. 1 can have a coefficient of static friction of at least 0.75 (e.g., at least 0.77, at least 0.80, at least 0.83, at least 0.85), and/or a coefficient of kinetic friction of at least 0.65 (e.g., at least 0.68, at least 0.70, at least 0.73, at least 0.75, at least 0.80).

In general, tiles fabricated according to the process shown in FIG. 1 can exhibit relatively small variation in the coefficient of kinetic friction under dry and wet conditions. For example, the coefficient of kinetic friction of the tiles under wet conditions can be smaller than the coefficient of kinetic friction under dry conditions by 0.07 or less (e.g., 0.06 or less, 0.05 or less, 0.04 or less, 0.03 or less, 0.02 or less, 0.01 or less). The coefficient of kinetic friction under wet conditions can be reduced by 5.0% or less (e.g., 4.0% or less, 3.0% or less, 2.0% or less, 1.0% or less) of the value of the coefficient of kinetic friction under dry conditions.

Tiles fabricated according to the process shown in FIG. 1 can have properties that are favorable for applications such as road and building construction. For example, the tiles can have a tensile strength of 5 MPa or more (e.g., 6 MPa or more, 7 MPa or more, 10 MPa or more, 15 MPa or more).

As a further example, the tiles can have a flexural strength of 5 MPa or more (e.g., 6 MPa or more, 7 MPa or more, 8 MPa or more, 10 MPa or more, 12 MPa or more, 15 MPa or more). The flexural strength can be determined by applying identical loads to a tile at one-third and two-thirds points along a length of the tile, where the thickness of the tile is one third of the length. The loads are increased until fracture occurs within the middle one-third of the length, with the pressure applied by the load corresponding to the flexural strength.

As another example, the tiles can have a compressive strength of 20 MPa or more (e.g., 25 MPa or more, 30 MPa or more, 40 MPa or more, 50 MPa or more, 60 MPa or more, 70 MPa or more, 80 MPa or more). The compressive strength can be determined by applying a uniform load to a tile surface and increasing the applied load until complete fracture occurs. The compressive strength corresponds to the pressure applied by the load that leads to complete fracture.

The tile thickness has been observed to be an important factor in some embodiments that influences various mechanical and structural properties of the tiles. As the thickness of the tiles is increased, in general, the tiles are more mechanically resilient, exhibiting greater compressive and tensile strength, and resisting mechanical deformation and cracking. However, increasing the thickness of the tiles also increases the amount of time over which the solvent evaporates from the polystyrene-based solution. This is due primarily to the larger thickness of the material from which gaseous solvent molecules escape. It has been determined that by fabricating tiles of a thickness between 0.7 inches and 1.1 inches (e.g., between 0.7 inches and 1.0 inches, between 0.8 inches and 1.0 inches, between 0.85 inches and 0.95 inches), a suitable balance can be achieved between acceptable mechanical properties and suitable solvent evaporation rates.

Figure 6A:
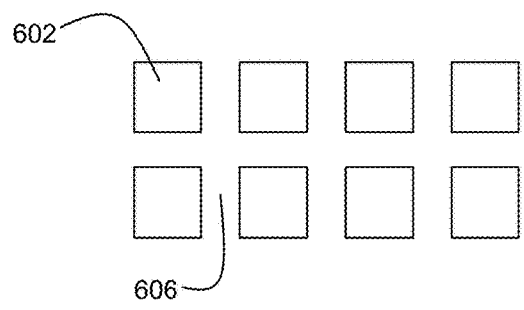
FIG. 6A is a schematic diagram showing an arrangement of square tiles.
Figure 6B:
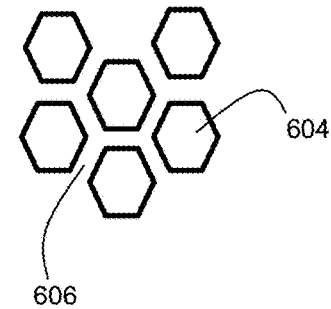
FIG. 6B is a schematic diagram showing an arrangement of hexagonal tiles.

To form a road, a sidewalk, a bridge, or another type of thoroughfare, tiles formed according to the process shown in FIG. 1 are assembled edge-to-edge to form the structure. FIGS. 6A and 6B are schematic diagrams showing examples of square tiles 602 and hexagonal tiles 604 assembled to form a road or sidewalk. A mortaring agent 606 can optionally be applied to secure the tiles in place relative to one another, adding mechanical strength to the structure that is formed. As discussed above, suitable mortaring agents include, but are not limited to, epoxy resins, which can be applied by spray coating, painting, and other such processes to the surfaces of the assembled tiles. In addition to providing stability to individual tiles, the mortaring agent helps to connect groups of tiles to form integral structures. As a result, structures that are significantly larger than individual tiles can be effectively manufactured, transported, and assembled.

Tiles formed according to FIG. 1 can also be used as structural materials in other construction applications, including for example building construction. Tiles fabricated for this purpose can generally have properties adjusted for particular applications. For example, tiles fabricated for use as an exterior coating material on the outside of a building may not include abrasive materials such as sand, but may include coloring agents to impart a desired color to the building's exterior. In general, when used for applications such as building construction, the tiles are assembled in a manner similar to FIGS. 6A and 6B, and can be secured in place using a mortaring agent, or by various mechanical fastening devices/systems, including conventional fasteners such as screws, and frame- or track-based mounting systems.

FIG. 10 is a schematic diagram showing a load bearing surface such as a roadway or sideway constructed from multiple tiles. The surface includes border tiles 1002 that form the edges of the surface and interior tiles 1004 positioned between border tiles 1002. Anchors 1006 extend upward from base 1008 and into cooperating recesses formed in the undersides of border tiles 1002 (e.g., during the molding process). The anchors secure border tiles 1002 in place so that border tiles 1002 are preventing from sliding or otherwise being displaced. The system of anchors 1006 shown in FIG. 10 is particularly useful, for example, when the load bearing surface is formed on an incline and/or when tiles 1002 and 1004 are subject to large lateral forces (i.e., approximately parallel to the plane of the load bearing surface) that tend to displace tiles 1002 and 1004 from their positions.

Anchors 1006 can be formed from a variety of materials including various metals such as steel, aluminum, and iron, aggregate materials such as concrete, and molded materials such as hard plastics. As shown in FIG. 10, in some embodiments, anchors 1006 are positioned such that only border tiles 1002 are anchored to base 1008. Interior tiles 1004 remain in place due to the anchored nature of border tiles 1002 and/or via application of a mortaring agent as discussed above.

Alternatively, in certain embodiments, each of the tiles used to form a load bearing surface includes recesses that engage with cooperating anchors 1006 to anchor the tiles to a base. A load bearing surface formed in such a manner would effectively include only border tiles 1002 as shown in FIG. 10.

Although two anchors 1006 are used to fix each border tile 1002 in position in FIG. 10, more generally, any number of anchors 1006 can be used to fix each border tile 1002, and the anchors (and corresponding recesses) can be positioned at any location relative to the tile surface. For example, each border tile can be fixed in position with one anchor, two anchors, three anchors, four anchors, or even more than four (e.g., five, six, seven, eight) anchors. Different numbers of anchors can be used, depending upon the location of tiles within the load bearing surface. For example, tiles that form the borders of the load bearing surface can be fixed in position with more anchors than tiles that form the interior of the load bearing surface.

Other mechanisms can also be used to fix the tiles in position. FIG. 11 shows a schematic diagram of a load bearing surface fabricated from multiple tiles 1102. Tiles 1102 are held in place by a frame 1104 that secures the outer edges of the tiles that form the edge or border of the load bearing surface. Frame 1104 can be formed from any one of various metals such as steel, aluminum, and iron, from aggregate materials such as concrete and/or brick, and from relatively hard plastic materials.

Although frame 1104 in FIG. 11 is positioned around only the outer edges of the border tiles, frame 1104 can also be implemented in other ways. For example, in some embodiments, frame 1104 can surround each individual tile that forms the load bearing surface. In other words, frame 1104 can include members that define a series of openings, each one of which is dimensioned to receive or accommodate a tile. In certain embodiments, frame 1104 defines a series of openings that accommodate multiple tiles (e.g., groups of 2 tiles, or 3 tiles, or 4 tiles, or even more than 4 tiles).

In some embodiments, individual tiles can include structural features that permit engagement or "locking" of tiles together when forming a structure. In general, a wide variety of different structural features can be implemented. In general, tiles can be molded such that structural features formed in one tile are positioned to engage with cooperating structural features in one or more adjacent tiles when the tiles are laid out in a particular pattern.

FIG. 12A shows a schematic diagram of one example of a tile 1202 that includes tile engagement features 1204. Features 1204 are implemented as protrusions or extensions that extend outward from the body of tile 1202 and are integrally formed with the body of tile 1202 during the molding process. A corresponding set of cooperating recesses formed in complementary regions of tile 1202, dimensioned to receive features 1204, are not shown in FIG. 12A.

FIG. 12B is a schematic cross-sectional diagram through the thickness of tile 1202. Features 1204 are shown extending from the body of tile 1202. In addition, tile 1202 includes recesses 1206 positioned so that when multiple tiles 1202 are arranged in a rectangular array, features 1204 from one tile are received within cooperating recesses 1206 of two adjacent tiles. As such, tiles 1202 arranged in a rectangular array are "locked" together and resist lateral movement.

In general, features 1204 and recesses 1206 can have a wide variety of different shapes to ensure that tiles 1202 are secured to one another. In some embodiments, for example, features 1204 can have flared ends having a dimension (i.e., a width or diameter) that is larger than a dimension along another portion of the features 1204. In certain embodiments, features 1204 may be differently shaped (i.e., asymmetrical) so that tiles 1202 can only be connected in a particular arrangement, or so that only certain tiles 1202 can be connected to one another. In some embodiments, tiles 1202 include electrical conductors that extend into features 1204 and recesses 1206. When tiles 1202 are assembled, the tiles are electrically connected to one another when features 1204 are received within recesses 1206.

Tiles formed as discussed above in connection with FIG. 1 can include different coatings disposed on different tile surfaces. In particular, coatings can be applied to certain tile surfaces to facilitate tile assembly to construct a load bearing surface, while other coatings can be applied to other tile surfaces to facilitate tile-to-tile bonding and/or to protect the tiles against environmental exposure.

Figure 13A:
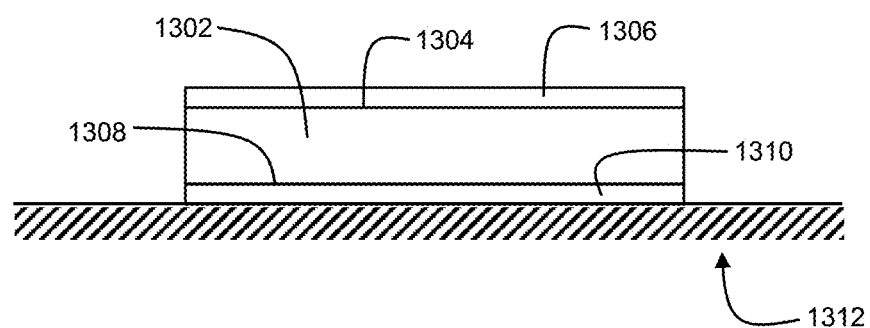
FIG. 13A is a schematic diagram of a tile with coatings on upper and lower surfaces.

FIG. 13A is a schematic diagram showing a tile 1302 that includes a first coating 1306 disposed on a first surface 1304, and a second coating 1310 disposed on a second tile surface 1308. When used to construct a roadway, sidewalk, or other thoroughfare, first surface 1304 is the "upper" surface of tile 1302 (i.e., the surface that receives vehicular and/or pedestrian traffic) and second surface 1308 is the "lower" surface of tile 1302 (i.e., the surface that faces the ground). First coating 1306 can include any of the coating materials discussed above, including chemical protective materials, UV-protecting materials, thermal stabilizers, structural additives, and materials for adjusting friction properties of tile 1302.

Second coating 1310 can include one or more materials that assist in adhering, fixing, or otherwise securing tile 1302 to base 1312. Depending upon the nature of base 1312, second coating 1310 can include a variety of different materials. For example, second coating 1310 can include an epoxy material, an aggregate material, or another type of adhesive. Second coating 1310 can include materials that are activated, for example, when wetted, so that tiles 1302 can be conveniently stored under dry conditions and then secured to base 1312 during assembly simply by applying water to surface 1308 of each tile.

Figure 13B:
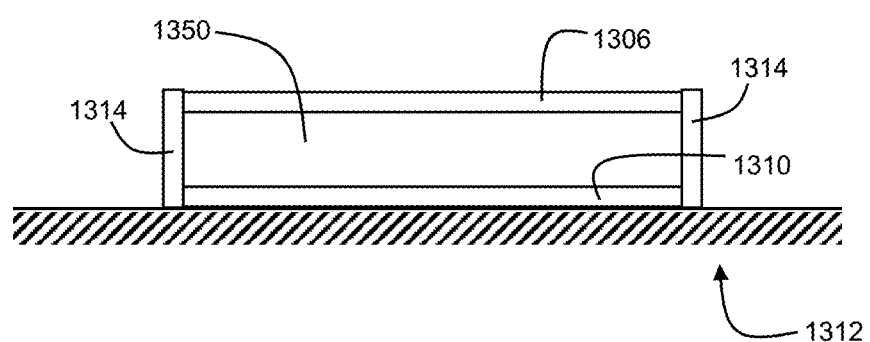
FIG. 13B is a schematic diagram of a tile with coatings on upper, lower, and lateral surfaces.

FIG. 13B is a schematic diagram of a tile 1350 that includes coatings similar to those of FIG. 13A. In addition, tile 1350 includes coatings 1314 applied to the lateral surfaces of the tile. Coatings 1314 include one or more materials that adhere adjacent tiles to one another during assembly. Suitable materials include epoxy resins, chemical activators, and other adhesives. In some embodiments, coatings 1314 can be applied to the lateral surfaces of tiles 1350 during assembly of the tiles. Alternatively, in certain embodiments, coatings 1314 can be pre-applied to tiles 1350 in dry or non-adhesive form, and can be activated during assembly of tiles 1350, e.g., by wetting or other chemical activation of coatings 1314. In combination with (or as an alternative to) coating 1310, coatings 1314 assist in securing tiles 1350 to one another during assembly so that the assembled structure resists lateral displacement of the tiles.

EXAMPLES

The following examples supplement the foregoing disclosure, but are not intended to limit the scope of the disclosure in any manner.

Figure 7:
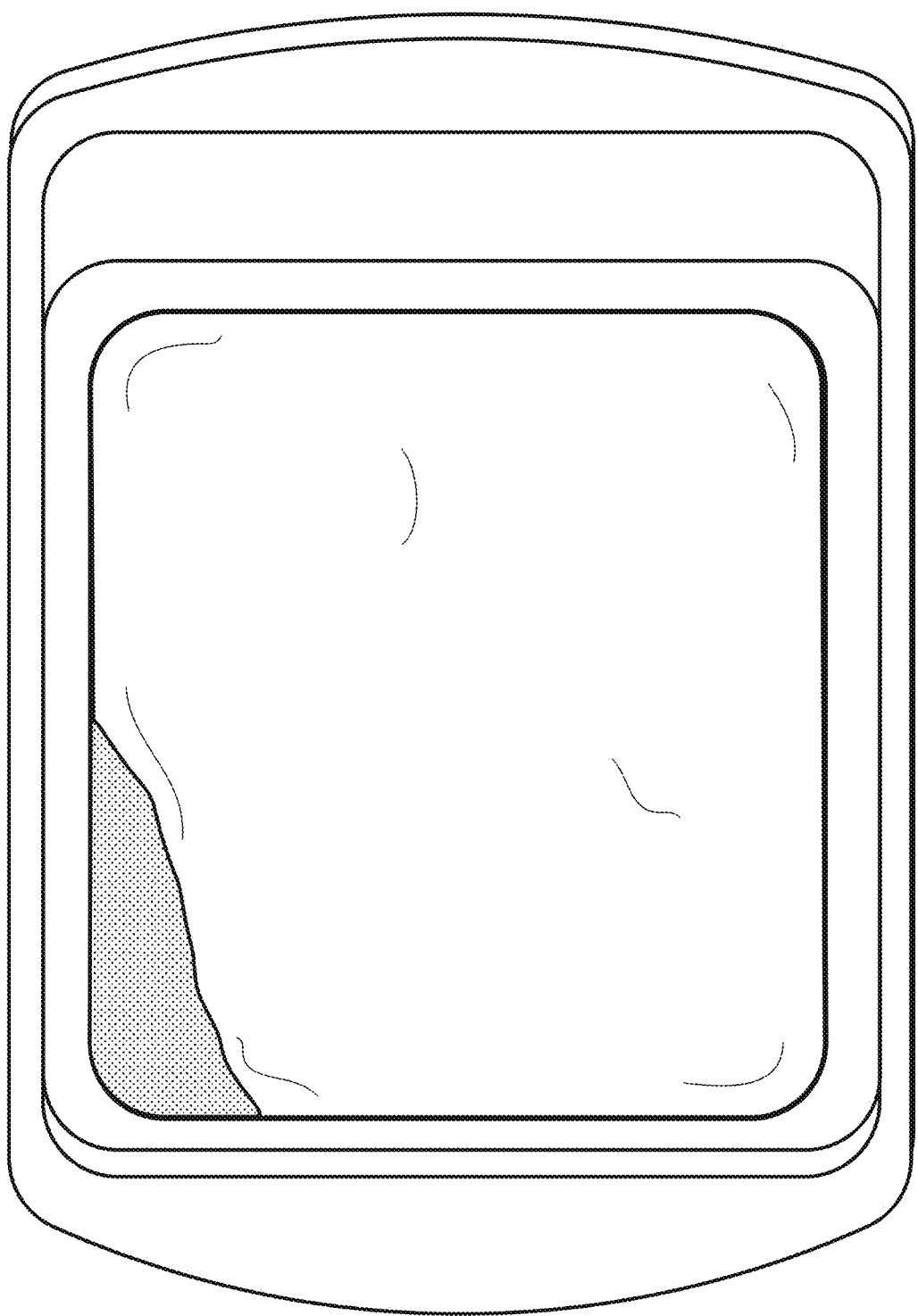
FIG. 7 is a schematic diagram of a polystyrene solution in a mold.

To fabricate a polystyrene-based tile, 55 g of polystyrene material was shredded into small pieces and dissolved in 100 mL of acetone with stirring. The resulting dissolved polystyrene solution was poured into a square mold. FIG. 7 shows a schematic diagram of the dissolved polystyrene solution in the mold.

Figure 8:
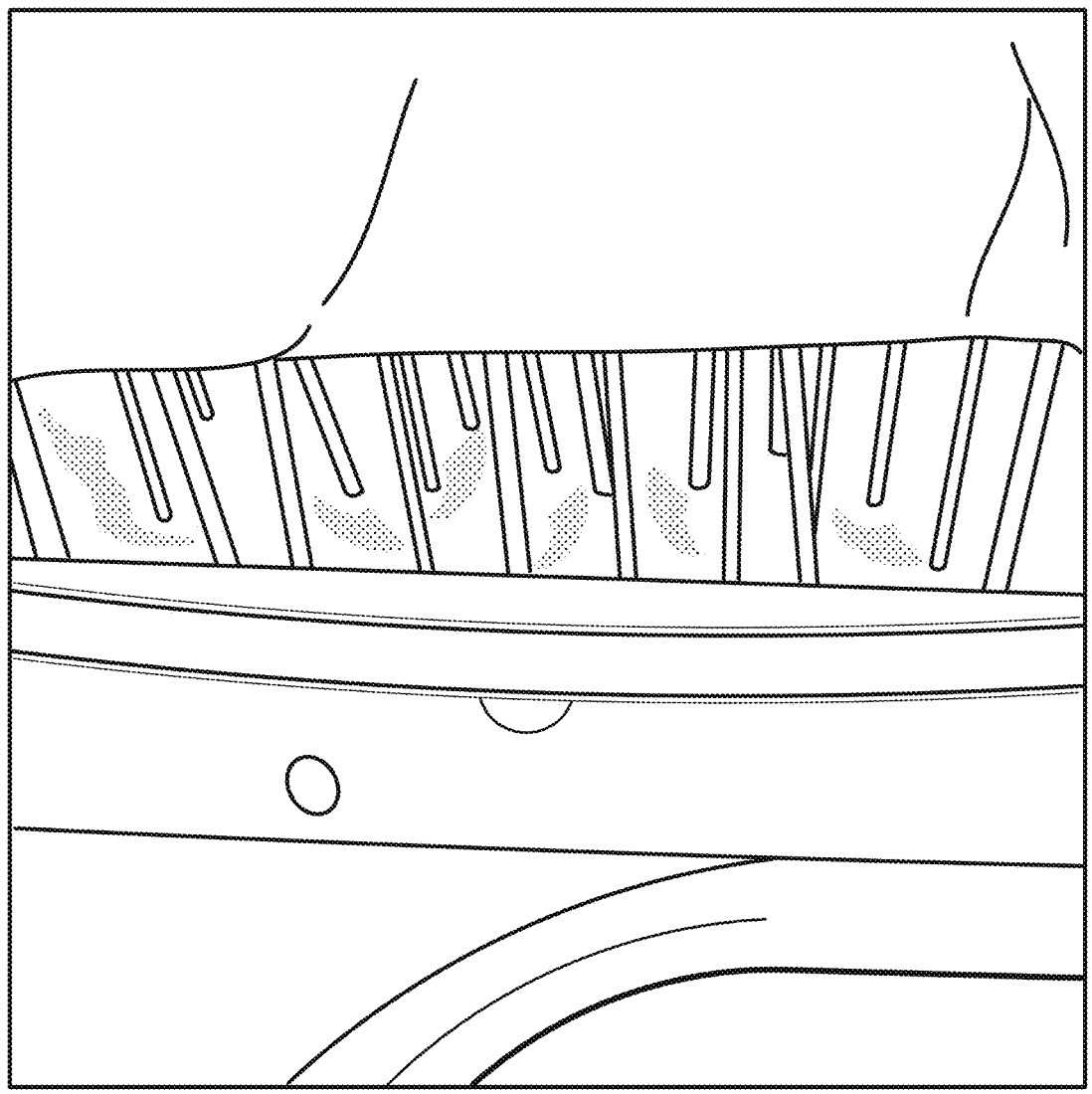
FIG. 8 is a schematic diagram of a polystyrene solution in a mold, and a mold cap atop the polystyrene solution.

A mold cap with a plurality of extensions was then positioned atop the square mold so that the extensions penetrated completely through the polystyrene solution. FIG. 8 shows a schematic diagram of the polystyrene solution in the mold with the mold cap positioned so that the extensions penetrate through the solution.

Figure 9:
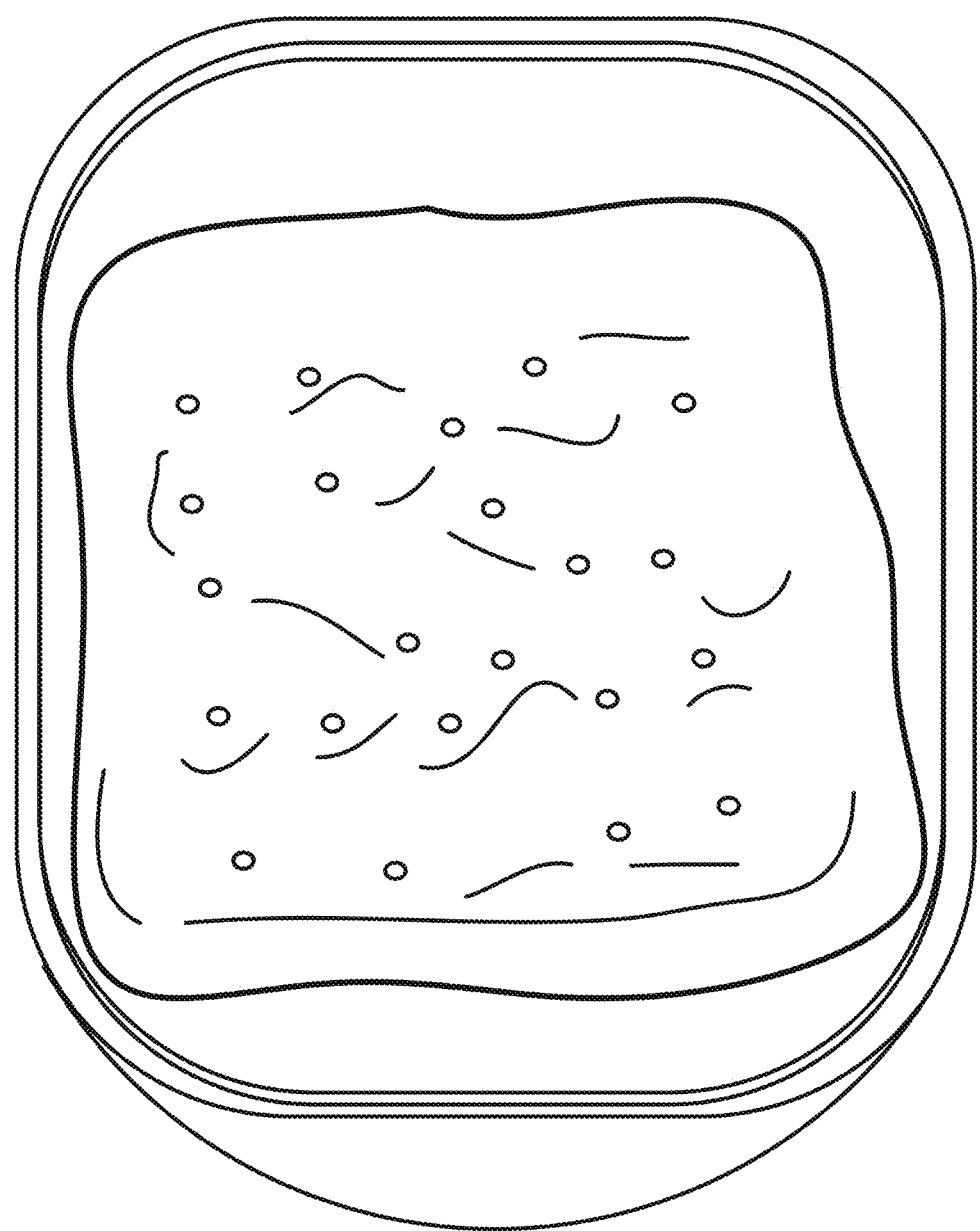
FIG. 9 is a schematic diagram of a polystyrene-based tile.

The acetone was allowed to evaporate, and a condensed polystyrene tile was formed. The tile was removed from the mold and an epoxy resin was applied to all surfaces of the tile by painting to create a stabilizing layer. Sand was applied to the wet epoxy coating to increase the coefficient of friction of the tile surface. FIG. 9 shows a schematic diagram of tile following removal from the mold. The channels formed in the bulk structure of the tile by the mold cap are readily apparent in the schematic diagram.

Various mechanical properties of the fabricated tile were tested and/or measured to evaluate the tile's performance. A weight stress test was performed by placing the tile on an even support surface, and successively stacking weights onto the top surface of the tile to progressively increase the total weight applied to the tile. No fracturing of the tile was observed after application of a total of 1500 pounds to the tile surface.

A freezing test was performed by filling the channels of the tile with water, and reducing the temperature of the tile to freeze the water thus introduced. After two hours at a temperature below 0° C., no fracturing or other mechanical damage to the tile was apparent. Repetition of this test for several freeze-thaw cycles also produced no apparent damage to the tile. This result suggests that tiles fabricated according to the methods discussed above can function as structural materials even under relatively extreme environmental conditions.

The coefficients of static and kinetic friction of the tile were measured under both wet and dry conditions. When dry, the tile surface had an average coefficient of static friction of 0.97, and an average coefficient of kinetic friction of 0.75. When wet, the tile surface had an average coefficient of static friction of 0.81, and an average coefficient of kinetic friction of 0.71. The coefficients of static and kinetic friction for the tile under dry conditions were similar to the coefficients for concrete under dry conditions, suggesting that tiles formed as discussed above can be used as suitable replacements for concrete roads and sidewalks. Under wet conditions, the coefficient of static friction was reduced by an amount similar to the reduction of the coefficient of static friction of concrete; however, the coefficient of kinetic friction was only marginally reduced, unlike concrete for which the coefficient of kinetic friction is also noticeably reduced under wet conditions. This suggests that tiles fabricated as discussed herein may provide a safer driving and/or walking surface under wet conditions than conventional road construction materials.

OTHER EMBODIMENTS

While examples have been provided for purposes of explanation, combinations, substitutions and alterations can be made without deviating from the spirit of the disclosure, and it is intended that the scope of the disclosure be limited only by the claims appended hereto.

What is claimed is:

1. A structural tile, comprising:
a tile body comprising a first functionalized polystyrene-based material, a second polystyrene-based material that is non-functionalized or functionalized differently than the first polystyrene-based material, and sand, and comprising a plurality of pores formed in the tile body; and
a coating comprising an epoxy resin and an aggregate material, disposed on at least one surface of the tile body,
wherein the structural tile has a dry coefficient of kinetic friction of at least 0.75 and a wet coefficient of kinetic friction of at least 0.70; and
wherein the dry coefficient of kinetic friction is larger than the wet coefficient of kinetic friction by 0.05 or less.

2. The tile of claim 1, wherein the dry coefficient of kinetic friction is larger than the wet coefficient of kinetic friction by 0.03 or less.

3. The tile of claim 1, wherein the aggregate material comprises sand.

4. The tile of claim 1, wherein the coating is disposed on all surfaces of the tile body.

5. The tile of claim 1, wherein the tile body comprises at least one fluorescent agent.

6. The tile of claim 5, wherein the first functionalized polystyrene-based material comprises a functional group comprising a fluorescent chemical moiety.

7. The tile of claim 1, wherein the tile body comprises particles or wires formed from at least one metallic material.

8. The tile of claim 1, wherein the tile body comprises one or more coloring agents.

9. The tile of claim 1, wherein at least some of the plurality of pores extend completely through a thickness of the tile body from a first surface of the tile body to a second surface of the tile body opposite the first surface, forming channels in the tile body.

10. The tile of claim 1, wherein a density of pores in the tile body is 30% or less of a total volume of the tile body.

11. The tile of claim 10, wherein the density of pores in the tile body is 5% or less of the total volume of the tile body.

12. A structural tile, comprising:
a tile body comprising a first functionalized polystyrene-based material, a second polystyrene-based material that is non-functionalized or functionalized differently than the first polystyrene-based material, and one or more channels that extend from a top bearing surface to a bottom bearing surface of the tile body;
a coating comprising an epoxy resin and an aggregate material, disposed on at least one surface of the tile body; and
at least one conductive wire extending through the tile body and comprising electrodes attached to the at least one conductive wire, the electrodes positioned so that when two tiles are located adjacent to one another in a grid, the two tiles are electrically connected through the electrodes.

13. The tile of claim 12, wherein the aggregate material comprises sand.

14. The tile of claim 13, wherein the coating is disposed on all surfaces of the tile body.

15. The tile of claim 12, wherein the tile body comprises at least one fluorescent agent.

16. The tile of claim 15, wherein the first functionalized polystyrene-based material comprises a functional group comprising a fluorescent chemical moiety.

17. The tile of claim 12, wherein the tile body comprises one or more coloring agents.

* * * * *